US005456879A

United States Patent [19]

Suovaniemi

[11] Patent Number: 5,456,879

[45] Date of Patent: Oct. 10, 1995

[54] PIPETTE

[75] Inventor: Osmo Suovaniemi, Helsinki, Finland

[73] Assignee: Biohit Oy, Helsinki, Finland

[21] Appl. No.: 966,162

[22] PCT Filed: May 3, 1991

[86] PCT No.: PCT/FI91/00132

§ 371 Date: Dec. 30, 1992

§ 102(e) Date: Dec. 30, 1992

[87] PCT Pub. No.: WO92/14571

PCT Pub. Date: Feb. 6, 1992

[30] Foreign Application Priority Data

May 4, 1990 [FI] Finland .................................... 902266

[51] Int. Cl.[6] ................................ B01L 3/02; G01N 1/14

[52] U.S. Cl. .................. 422/100; 73/863.22; 73/864.13; 73/864.14; 73/864.17

[58] Field of Search ............................ 73/864.13, 863.32, 73/864.14, 864.16, 864.17; 422/99, 65, 104, 100

[56] References Cited

U.S. PATENT DOCUMENTS

| | | | |
|---|---|---|---|
| 2,575,425 | 11/1951 | Nelson | 604/222 |
| 3,656,480 | 4/1972 | Rubricius | 604/218 |
| 4,158,035 | 6/1979 | Haase et al. | 422/100 |
| 4,215,092 | 6/1980 | Suovaniemi et al. | 422/100 |
| 4,335,621 | 6/1982 | Tervamäki et al. | 422/100 |
| 4,599,220 | 7/1986 | Yonkers et al. | 422/100 |
| 4,779,467 | 10/1988 | Rainin et al. | 422/100 |
| 4,824,642 | 4/1989 | Lyman et al. | 422/100 |
| 4,967,604 | 10/1990 | Arpagaus et al. | 73/864.13 |
| 5,057,281 | 10/1991 | Torti et al. | 422/100 |

FOREIGN PATENT DOCUMENTS

| | | |
|---|---|---|
| 0172508 | 2/1986 | European Pat. Off. . |
| 0226867 | 7/1987 | European Pat. Off. . |
| 60137 | 8/1981 | Finland . |
| 2115719 | 9/1983 | United Kingdom . |

*Primary Examiner*—Robert J. Warden
*Assistant Examiner*—E. Leigh Dawson
*Attorney, Agent, or Firm*—Merchant, Gould, Smith, Edell, Welter & Schmidt

[57] ABSTRACT

A pipette, comprising a plurality of side-by-side cylinders (1) with plungers (2) and seats (4) for attaching tip pieces to the pipette, and an operating member (5), to which the plungers are connected for moving them with the aid of an operating means (6) connectable to said operating member, said operating member (5) being fork-like and comprising a stem (7), a coupling member (8) connected to the stem and plunger rods (3) connected to the coupling member. The plungers are made of resilient material and are elastically connected to the plunger rods.

4 Claims, 1 Drawing Sheet

PIPETTE

The present invention concerns e pipette comprising a body; mounted in said body, a plurality of mutually parallel, side-by-side cylinders with plungers, plunger rods end seats for attaching tip pieces the pipette, end a fork-like operating member comprising a stem and a coupling member thereto connected, the plunger rods with their plungers being connected said coupling member in order to be simultaneously movable with the aid of an operating means that can be connected to the operating member, the operating member with stem, coupling member and plunger rods constituting a solid entity, advantageously formed substantially in a single work step, e.g. by extrusion Regarding the state of art, reference is made to the Finnish Patents No. 60137 and No. 73368. In these references pipettes of the type described above are disclosed, in which the plunger rods with plungers are connected to a fork-like operating member for moving the plungers simultaneously with the aid of an operating means connectable to the operating member. However, problems have emerged in pipettes of kind, particularly as regards the mutually consistent movement of the plungers. The plungers tend to move inconsistently end even to seize in the cylinders is due to manufacturing tolerances end to the even minor centering errors in a plunger are likely to result in seizing, as the adjacent plunger(s) determine(s) the detection in which the coupling member, and consequently the rest of the plunger rods and plungers, move.

The object of the present invention is to eliminate the drawbacks to which attention was called in the foregoing.

It is a further object of the invention to provide a novel serial pipette which is less complex in design, more reliable in operation and more advantageous to its manufacturing cost than any serial pipettes of prior art.

Regarding the features characterizing the invention reference is made to the claims section.

As set forth in the foregoing, the operating member has fork-resembling shape. The coupling member connects with the stem substantially at right angles, and the plunger rods connect with the coupling member substantially at right angles, parallelling the stem and disposed in a row, one beside the other. Therefore, the operating member is a solid, unitary entity which connects on one hand with the operating means of the pipette, e.g. a hydraulically or pneumatically operating power means, and on the other hand with the plungers of the pipette. By virtue of the design of said operating means, operation of the plungers of the serial pipette will be simultaneous and mutually consistent.

As taught by the invention, the plungers are made of resilient material and they are elastically connected to the plunger rods.

In an embodiment of the invention the plungers are cylindrical in shape, and they have been arranged to abut with their outside surface against the inner surface of the cylinder. On their outside may be formed at least one collar-like sealing ring, and each plunger, with sealing ring, has been shaped in a single work step of a single material, e.g. by extrusion moulding.

The cylinders are connected to the body advantageously at both ends and immovably in their longitudinal, as well as advantageously their lateral, direction.

Thanks to the invention the manufacturing of the pipette's operating member and plungers can be implemented in a simple, easy and inexpensive manner. At the same time, simple and consistent operation of the pipette is achieved, i.e., the emptying and filling of cylinders takes place in a constant and consistent, and reliable way. Further, thanks to the invention, the pipette of the invention is advantageous as regards manufacturing cost.

BRIEF DESCRIPTION OF THE DRAWINGS

The invention is described in detail in the following, with the aid of embodiment examples and referring to the attached drawing, wherein:

In FIG. 1 is seen a pipette according to the invention, opened and in top view. The pipette comprises a box-like body 10 within which have been placed the cylinders 1 of the pipette, with plungers 2 and with seats 4 for attaching tip pieces (not depicted) to the pipette. The pipette further comprises an operating member 5, to which the plungers are coupled for moving them with the aid of an operating means 6 connectable to the operating member, such as a power cylinder.

Figure 1:
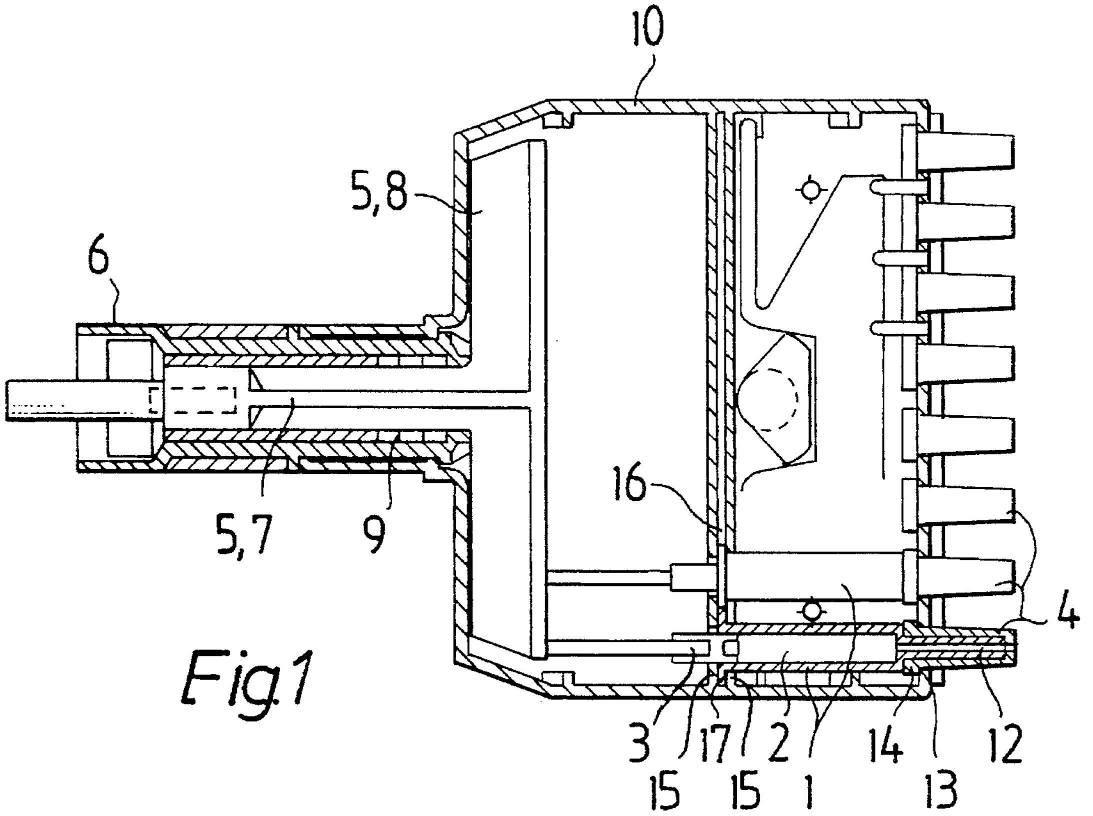
FIG. 1 presents a pipette according to the invention, opened and in top view.
Figure 2:
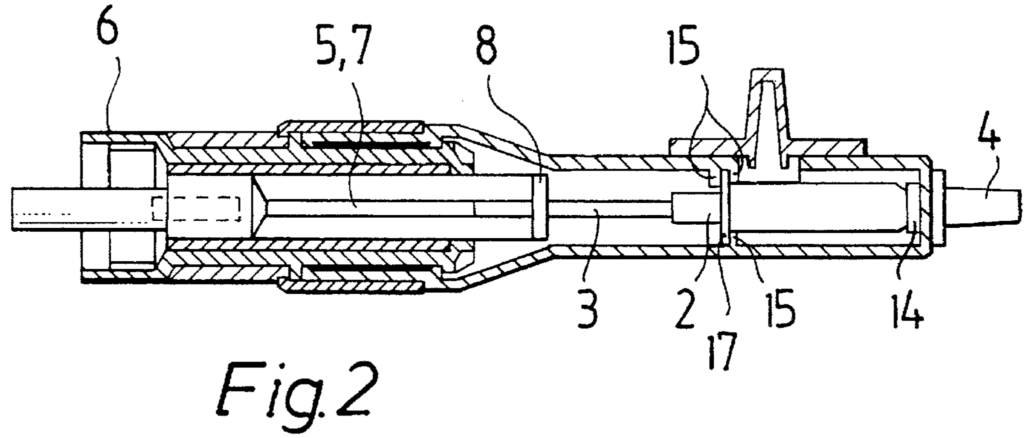
FIG. 2 presents the pipette of FIG. 1, opened and in elevational view.

The operating member 5 has fork-like shape. The operating member comprises a stem 7, and to this stem is transversally connected a rigid coupling member 8, to which the plunger rods 3 are connected. The stem 7 is carried in the housing 10 to be movable longitudinally, in the direction of the cylinders 1. The coupling member 8 connects substantially at right angles with the stem 7; similarly, the plunger rods 3 are connected substantially at right angles to the coupling member 8. The cylinders 1 and seats 4 and the operating member 5, with stem 7 and coupling member 8 and with the plunger rods connected to the coupling member, are mounted substantially in one plane so that when the stem of the operating member moves in the direction of the cylinders, the plungers 2 will move along with the stem of the operating member, by mediation of the coupling member, connected to the stem of the operating member, and of the rods. Thereby, the filling of all cylinders and individual pipettes in a serial pipette will be effected simultaneously, and in mutually consistent manner.

In FIG. 1 is further seen a return spring 9, disposed to move the stem 5 of the operating member, and thereby the coupling member 8 and plunger rods 3, and the plungers 2, away from the seats, that is, in the filling direction.

In the embodiment here depicted, the body 10 is mainly flat, and it constitutes the housing for the pipette. Separate cylinders 1, with tubular liquid passages 12 parallelling them and constituting their extensions, are provided with seats 4, which have been pushed in sleeve fashion upon the tubular liquid passages. The cylinders together with the seats have been mounted in mounting cut-outs provided in the body, so that the seats project through the apertures 13, the collars 14 of the seats abutting inwardly on the rims of the apertures, and the cylinders resting with their opposite ends on shoulders 15 formed by the rims of apertures in the mounting frame 16 of the body, by radially outward projecting flanges 17 formed on the respective ends of the cylinders. It is thus understood that all cylinders 1 with their seats 4 are disposed in parallel, side by side and at constant spacing in the housing constituted by the body 10, to be substantially immobile longitudinally, and elastically in lateral direction.

Figure 3:
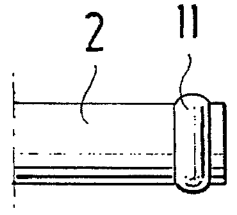
FIG. 3 presents, in elevational view, the plunger of a pipette according to an embodiment of the invention.

In FIG. 3 is seen a plunger 2 conforming to an embodiment of the invention. The plunger has been manufactured by extrusion of plastic raw material, mainly in a single work step. The plunger 2 has mainly cylindrical shape includes a collar-like sealing ring 11 and has been fitted into the cylinder.

The plunger 2 is advantageously made of resilient, elastic plastic material. The plunger is connected to the plunger rod 3 e.g. by friction bond, by gluing, with threads, or in any way whatsoever: the juncture is advantageously laterally resilient so that plungers located side by side can become centered in the cylinders flexibly and without seizing.

The invention is not confined to the embodiment examples that have been presented: its embodiments may vary within the scope of the claims following below.

I claim:

1. A serial pipette comprising: a main body, said main body including a plurality of plunger rods, a coupling member and a stem, said plunger rods, said coupling member and said stem are connected as a single body, a plurality of cylinders corresponding to the number of said plunger rods, said cylinders attached to said main body, and a plurality of plungers corresponding to the number of said plunger rods, said plungers at least partially within said cylinders in which:

a) said plungers are made of a resilient material; and b) said plungers are elastically connected to said plunger rods.

2. The pipette of claim 1, wherein said plungers are cylindrical in shape, and that each of said plungers has been formed in a single work step of a single material which is more elastic than said single body.

3. The pipette of claim 2, wherein said single work step includes extrusion.

4. The pipette of claim 1, wherein said cylinders are connected to said main body such that they are substantially immobile in the longitudinal direction.

* * * * *

UNITED STATES PATENT AND TRADEMARK OFFICE
CERTIFICATE OF CORRECTION

PATENT NO. : 5,456,879

DATED : October 10, 1995

INVENTOR(S) : Osmo Suovaniemi

It is certified that error appears in the above-identified patent and that said Letters Patent is hereby corrected as shown below:

title page item [87], PCT Pub. No. "WO92/14571" should be --WO91/16973--; and PCT Pub. Date "Feb. 6, 1992" should be --Nov. 14, 1991--.

In column 1:

line 3, before "pipette", "e" should be --a--;

line 5, "end" should be --and--;

line 6, after "pieces" insert --to--, and "end" should be --and--;

line 9, before "said" insert --to--;

line 24, "end" should be --and--, and after "cylinders" insert --. This--;

line 25, "end to the" should be --and to the fact that--; and line 27, "detection" should be --direction--.

Signed and Sealed this

Fourth Day of June, 1996

*Attest:*

BRUCE LEHMAN

*Attesting Officer*

*Commissioner of Patents and Trademarks*